United States Patent
Kramer et al.

(10) Patent No.: US 6,580,816 B2
(45) Date of Patent: *Jun. 17, 2003

(54) SCANNING CAPACITIVE SEMICONDUCTOR FINGERPRINT DETECTOR

(75) Inventors: Alan Kramer, Berkeley, CA (US); James Brady, Plano, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 47 days.

This patent is subject to a terminal disclaimer.

(21) Appl. No.: 09/877,440

(22) Filed: Jun. 8, 2001

(65) Prior Publication Data

US 2001/0043728 A1 Nov. 22, 2001

Related U.S. Application Data

(63) Continuation of application No. 09/006,670, filed on Jan. 13, 1998, now Pat. No. 6,317,508.

(51) Int. Cl.[7] .................................................. G06K 9/00
(52) U.S. Cl. ........................ 382/124; 382/126; 235/447
(58) Field of Search ................................ 382/124, 126, 382/312, 107; 235/439, 445, 446, 447, 451

(56) References Cited

U.S. PATENT DOCUMENTS

| | | | | |
|---|---|---|---|---|
| 5,325,442 A | * | 6/1994 | Knapp .......................... | 382/124 |
| 5,844,287 A | * | 12/1998 | Hassan et al. .............. | 257/419 |
| 6,317,508 B1 | * | 11/2001 | Kramer et al. .............. | 382/124 |

OTHER PUBLICATIONS

Matsubashi, Shin, " pointing device for display device ", Jun. 1992, pp. 1–11.*

* cited by examiner

Primary Examiner—Bhavesh Mehta
Assistant Examiner—Sheela Chawan
(74) Attorney, Agent, or Firm—Lisa K. Jorgenson; Peter J. Thoma

(57) ABSTRACT

A scanning fingerprint detection system includes an array of capacitive sensing elements, the array having a first dimension greater than the width of a fingerprint and a second dimension less than the length of a fingerprint. Each of the capacitive sensing elements has first and second conductor plates connected across an inverting amplifier, the conductor plates forming capacitors with the ridges and valleys of a fingerprint of a finger pressed against a protective coating above the array, the inverting amplifier generating a signal indicative of a ridge or valley. Circuitry is provided for scanning the array to capture an image of a portion of fingerprint and for assembling the captured images into a fingerprint image.

18 Claims, 2 Drawing Sheets

SCANNING CAPACITIVE SEMICONDUCTOR FINGERPRINT DETECTOR

CROSS-REFERENCE TO RELATED APPLICATIONS

This application is continuation of commonly assigned Application Ser. No. 09/006,670, filed Jan. 13, 1998; now U.S. Pat. No. 6,317,508.

FIELD OF THE INVENTION

The present invention relates generally to methods of and systems for capturing fingerprint images, and more particularly to a semiconductor capacitive fingerprint scanning device.

BACKGROUND OF THE INVENTION

Fingerprint recognition has been suggested for use in many security applications such as controlling access to buildings, computers, or the like. Fingerprint recognition systems enable a user to access the controlled facility without a device such as a key or smart card or without having to memorize a password or other personal identification number.

The sensing device is an important part of a fingerprint recognition system and the quality of the representation of the fingerprint that the device produces will affect recognition capability and the amount of processing required for verification of the fingerprint. Various technologies have been proposed for use in fingerprint sensing devices. One commonly proposed technology involves optical detection. Examples of optical fingerprint detection devices are disclosed in Jensen, U.S. Pat. No. 4,784,484; Fishbine, et al., U.S. Pat. No. 5,467,403; and Giles, et al., U.S. Pat. No. 5,548,394.

Optical detectors include a glass surface upon which a subject places his finger to be recognized. Optical detectors may present recognition problems when the glass surface or the subject's finger is wet. The optics of the detectors are constructed based upon the indices of refraction of air and glass. When water or perspiration is between the glass and the surface of the finger, the operation of the detector is affected.

In addition to optical sensors, various electrical sensor systems have been proposed, as for example in Knapp, U.S. Pat. No. 5,325,442; Tamori, U.S. Pat. No. 5,400,662; and Tamori, U.S. Pat. No. 5,429,006. The electrical detection devices typically comprise an array of sense elements. The individual sense elements respond with an output that depends upon whether a fingerprint ridge or valley is located over the sense element.

The electrical detection devices offer advantages over the optical detection device. However, an electrical detector that is large enough to detect a fingerprint is a large and expensive semiconductor device. For example, the TouchChip™ Silicon Fingerprint Sensor (STFP2015-50) available from STMicroelectronics, Inc. has an active sensor surface measuring 19.2 mm by 12.8 mm that includes a 384 by 256 sensor array. Accordingly, electrical detection devices tend to be more expensive than optical detectors.

It is an object of the present invention to provide a fingerprint detecting device that overcomes the shortcomings of the prior art.

SUMMARY OF THE INVENTION

The present invention provides a scanning fingerprint detection system that includes an array of capacitive sensing elements lying beneath the top surface of a protective layer. The array has a first dimension about the width of a fingerprint and a second dimension substantially less than the length of a fingerprint. Each of the capacitive sensing elements has first and second thin conductor plates, which are closely spaced relative to each other, and an inverting amplifier having an input connected to the first conductor plate and an output connected to the second conductor plate, the amplifier generating a signal indicative of a ridge or a valley of a fingerprint of a finger pressed against the top surface of the protective layer. Circuitry is provided for scanning the array to capture an image of a portion of fingerprint and for assembling the captured images into a fingerprint image as a fingerprint is moved over the array parallel to the second dimension.

DETAILED DESCRIPTION OF THE PREFERRED EMBODIMENT

Figure 1:
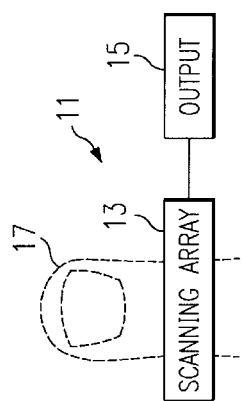
FIG. 1 is a block diagram of a system according to the present invention.

Referring now to the drawings, and first to FIG. 1, a fingerprint scanner according to the present invention is designated generally by the numeral 11. Fingerprint scanner 11 includes a scanning array 13, which captures an image of a fingerprint, and a suitable output 15. Scanning array 13 is preferably fabricated on a single semiconductor chip.

Scanning array 13 is rectangular in shape and has a width about the width of the surface of a finger 17 that contacts scanning array 13. In the preferred embodiment, scanning array 13 is about one-half inch or 12.8 mm wide. The length of scanning array 13 is substantially less than the length of the end of finger 17, and in the preferred embodiment, the length of scanning array 13 is about one-tenth inch or 2.5 mm. As will be described in detail hereinafter, fingerprint scanner 11 captures a fingerprint image as finger 17 is swept over scanning array 13.

Figure 2:
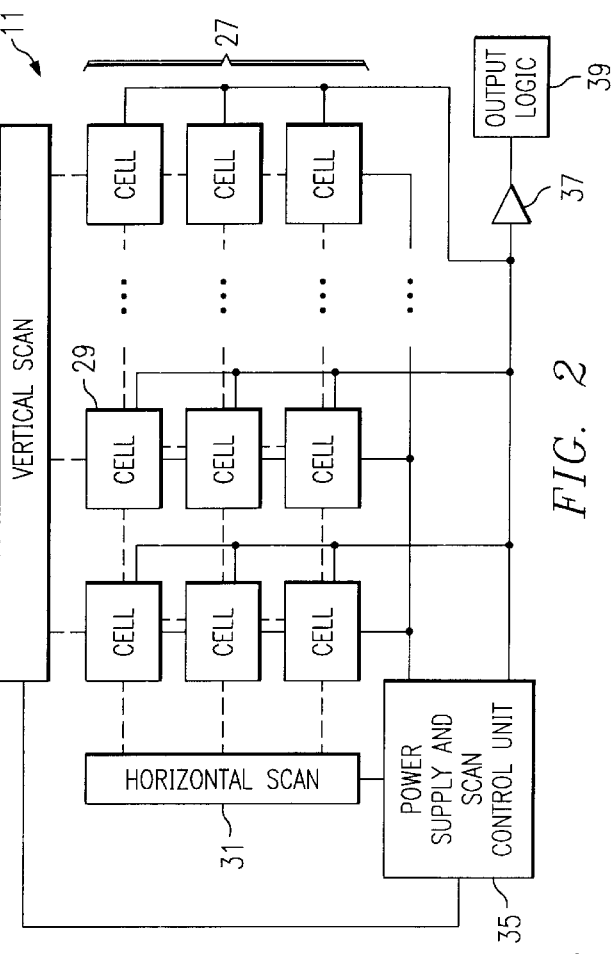
FIG. 2 is a block diagram of a sensor array according to the present invention.

Referring now to FIG. 2, there is shown a block diagram of scanning array 13. Scanning array 13 is preferably integrated into a single chip, and it includes a rectangular array 27 of cells 29 of the type illustrated in FIG. 3 hereof. Each cell 29 is smaller than the width of a fingerprint ridge.

In the preferred embodiment, cells 29 are on a pitch of 50 $\mu$m, which corresponds to a resolution of about 508 dpi. The exact number of rows needed depends upon the capabilities of the image regeneration software as well as the maximum finger speed and the frame rate at which array 27 is scanned. The number of rows must be sufficient so that, when the finger is moving at its maximum speed, a pair of consecutive frames has enough rows in common for them to be aligned by the regeneration algorithm. The more image rows in common from one frame to the next, the more exactly the regeneration algorithm can combine two frames into a single larger frame. In the preferred embodiment, array 27 comprises about twenty to fifty rows of cells in the shorter dimension and about 250 columns of cells in the longer dimension.

The fingerprint scanner 11 includes a horizontal scanning stage 31 and a vertical scanning stage 33. Scanning stages 31 and 33 enable one cell 29 at a time according to a predetermined scanning pattern. The scanning rate depends upon the maximum finger speed and the amount of blurring that can be tolerated. In the preferred embodiment, each cell 29 is scanned at a rate once each one to ten millisecond to produce a frame rate of 100 to 1,000 frames per second.

The fingerprint scanner 11 includes a power supply and scan control unit 35. Power supply and scan control unit 35 supplies a reference voltage to each cell 29 of array 27. Power supply and scan control 35 also operate scanning stages 31 and 33 to produce the desired scanning of cells 29.

An A/D converter 37 is connected to receive the output of each cell 29 of array 27. The output of A/D converter 37 is connected to output logic 39. Output logic 39 processes the output of A/D converter 37 to capture successive images of a portion of the fingerprint of the user. Output logic 39 compares successive images to detect movement of the fingerprint. If output logic 39 detects movement, output logic computes the displacement of the fingerprint ridges over the scanning period, which in the preferred embodiment is one to ten milliseconds, and assembles the captured images into a complete fingerprint image.

Figure 3:
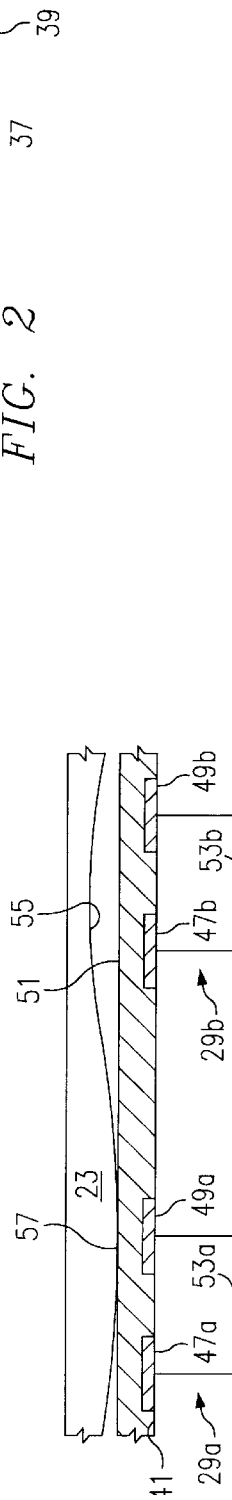
FIG. 3 illustrates the physical structure and electrical operation of individual sensor cells according to the present invention.

Referring now to FIG. 3, there is illustrated the structure and operation of a cell 29 according to the present invention. The cell of the preferred embodiment of the present invention is of type disclosed in Tartagni, U.S. Pat. No. 6,114,862, entitled Capacitive Distance Sensor, the disclosure of which is incorporated herein by reference. Each cell 29 includes a first conductor plate 47 and a second conductor plate 49 supported on a semiconductor substrate, which is preferably a conventional silicon substrate that may have a conventional shallow epitaxial layer defining an upper surface region thereof. The top surface of the substrate includes an insulating layer 41. Insulating layer 41 is preferably an oxide layer, which may be a conventional thermally grown silicon dioxide layer. Conductor plates 47 and 49 are covered by a protective coating 51 of a hard material, which protects cell 29 from moisture, contamination, abrasion, and electrostatic discharge.

Each cell 29 includes a high gain inverting amplifier 53. The input of inverter 53 is connected to a reference voltage source $V_{REF}$ through an input capacitor 54. The output of inverter 53 is connected to an output $V_{OUT}$. The input of inverter 53 is also connected to conductor plate 47 and the output of inverter 53 is also connected to conductor plate 49, thereby creating a charge integrator whose feedback capacitance is the effective capacitance between conductor plates 47 and 49.

When a finger 23 is placed on the surface of protective layer 51, the surface of the skin over each sensor acts as a third capacitor plate separated from adjacent conductor plates 47 and 49 by a dielectric layer that includes protective coating 51 and a variable thickness of air. Because fingerprint valleys or pores 55 will be farther from conductor plates 47 and 49 than finger ridges 57, sensors 29 beneath valleys or pores will have more distance between their conductor plates 47 and 49 and the skin surface than sensors under ridges. The thickness of this dielectric layer will modulate the capacitance coupling between plates 47 and 49 of each cell 29. Accordingly, sensors 29 under valleys or ports will exhibit a different effective capacitance than sensors 29 under ridges. As shown in FIG. 3, the effective capacitance of sensor 29a is different from the effective capacitance fo sensor 29b.

Sensors 29 work in two phases. During the first phase, the charge integrator is reset with a switch 59 by shorting the input and output of inverter 53. This causes inverter 53 to settle at its logical threshold. During the second phase a fixed charge is input to the charge integrator, causing an output voltage swing inversely proportional to the feedback capacitance, which is the effective capacitance between conductor plates 47 and 49. For a fixed amount of input charge, the output of inverter 53 will range between two extremes depending on the effective feedback capacitance value. The first extreme is a saturated voltage level if the effective feedback capacitance is very small. The second extreme is a voltage close to the logical threshold, which is the reset value, when the effective feedback capacitance is large. Since the distance between the skin and the sensor changes the effective feedback capacitance of the charge integrator, the output of sensor 29a under ridge 57 will be different from the output of sensor 29b under valley 55.

Figure 4:
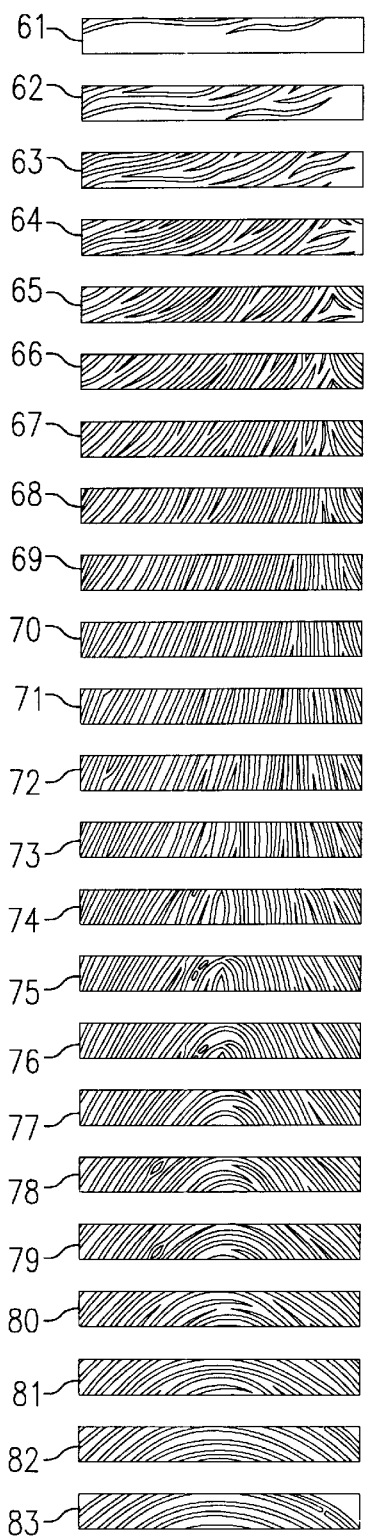
FIG. 4 illustrates a sequence of partial fingerprint images captured according to the present invention.
Figure 5:
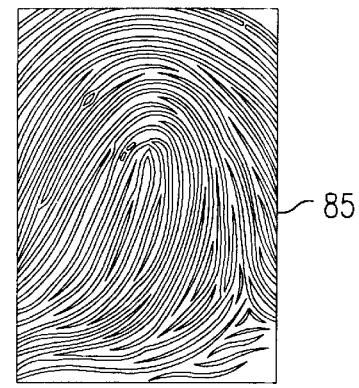
FIG. 5 illustrates a fingerprint image assembled according to the present invention from the partial images of FIG. 4.

The operation of the present invention to capture a fingerprint image is illustrated with respect to FIGS. 4 and 5. FIG. 4 illustrates a sequence of partial fingerprint images 61–83 captured according to the present invention. FIG. 5 illustrates a fingerprint image 85 assembled according to the present invention from partial images 61–83. In FIG. 4, partial image 61 is captured first and partial image 62 is captured an instant later. It will be noted that partial images 61 and 62 share a number of common fingerprint features. Similarly, partial images 63 through 83 are captured at sequentially later instants of time and they each share fingerprint features with their sequentially adjacent partial images. Output logic 39 of FIG. 2 compares successive partial images 61–83 to detect movement of the fingerprint. If output logic 39 detects movement, output logic computes the displacement of the fingerprint ridges over the scanning period, which in the preferred embodiment is one to ten milliseconds, and assembles the captured images into a complete fingerprint image 85.

From the foregoing, it may be seen that the present invention is well adapted to overcome the shortcomings of the prior art. The capacitive sensors of the present invention enable the device to be scanned at a high frame rate. The high frame rate enables a finger to be moved quickly over the device. Additionally, the high frame rate reduces the number of rows needed to capture the successive images. The device of the present invention is thus small in size, an it may be fabricated on a single integrated circuit chip. The present invention provides the advantages of electrical fingerprint detection at a cost lower than optical systems.

Although the present invention has been illustrated and described with respect to a presently preferred embodiment, it is to be understood that various changes, substitutions and alterations can be made therein without departing from the spirit and scope of the invention as defined by the appended claims.

What is claimed is:

1. A fingerprint detection system formed on a single semiconductor chip, the system comprising:
   a rectangular scanning array defined by a first dimension and a second dimension wherein the first dimension is larger than the second dimension, the array comprising capacitive sensing cells arranged in rows and columns, the rows being aligned with the first dimension and the columns being aligned with the second dimension, the number of columns exceeding the number of rows;
   a horizontal scanning stage connected to the array for scanning the rows of capacitive sensing cells;

a vertical scanning stage connected to the array for scanning the columns of capacitive sensing cells;

a scan control unit connected to the scanning stages for operating the scanning stages to enable one capacitive sensing cell at a time according to a predetermined scanning pattern to scan the entire array at a frame rate of multiple frames per second;

a thin protective layer disposed above the scanning array and providing a top surface for contact by a finger;

an A/D converter connected to each capacitive sensing cell and having an output; and output logic connected to the output of the A/D converter for capturing successive images at the frame rate as a finger is moved over the scanning array in a direction parallel to the second dimension while in contact with the top surface of the thin protective layer, and for assembling the successive images into a complete fingerprint image;

wherein each capacitive sensor cell comprises: adjacent first and second thin conductor plates, the conductor plates being closely spaced relative to each other and lying beneath the top surface of the protective layer; an inverting amplifier having an input and an output, the input being connected to the first conductor plate and the output being connected to the second conductor plate and to the A/D converter; and a reference voltage source connected to the input of the inverting amplifier.

2. The fingerprint detection system of claim 1 wherein said first dimension is about one-half inch and said second dimension is about one-tenth inch.

3. The fingerprint detection system of claim 1 wherein the capacitive sensing cells are regularly spaced from each other at a pitch of about 50 microns.

4. The fingerprint detection system of claim 1 wherein the scanning array has from 20 to 50 rows and about 250 columns of capacitive sensing elements.

5. The fingerprint detection system of claim 1 wherein the scan control unit operates the scanning stages to scan the entire array of cells at a frame rate in the range of 100 to 1000 frames per second.

6. The fingerprint detection system of claim 1 wherein each capacitive sensor cell further comprises a switch connected across the inverting amplifier to short the amplifier's input to its output when the switch is closed causing the amplifier to settle at its logical threshold, whereby upon opening the switch the amplifier's output voltage swings inversely proportional to the capacitance between the first and second conductor plates.

7. A fingerprint detection system formed on a single semiconductor chip, the system comprising:

a rectangular scanning array defined by a first dimension and a second dimension wherein the first dimension is larger than the second dimension, the array comprising capacitive sensing cells arranged in rows and columns, the rows being aligned with the first dimension and the columns being aligned with the second dimension, the number of columns exceeding the number of rows;

a horizontal scanning stage connected to the array for scanning the rows of capacitive sensing cells;

a vertical scanning stage connected to the array for scanning the columns of capacitive sensing cells;

a scan control unit connected to the scanning stages for operating the scanning stages to enable one capacitive sensing cell at a time according to a predetermined scanning pattern to scan the entire array at a frame rate of multiple frames per second;

a thin protective layer disposed above the scanning array and providing a top surface for contact by a finger;

an A/D converter connected to each capacitive sensing cell and having an output; and output logic connected to the output of the A/D converter for capturing successive images at the frame rate as a finger is moved over the scanning array in a direction parallel to the second dimension while in contact with the top surface of the thin protective layer, and for assembling the successive images into a complete fingerprint image;

wherein each capacitive sensor cell comprises: adjacent first and second thin conductor plates, the conductor plates being closely spaced relative to each other and lying in a single plane proximate to and beneath the top surface of the protective layer; an inverting amplifier having an input and an output, the input being connected to the first conductor plate and the output being connected to the second conductor plate and to the A/D converter; and a reference voltage source connected to the input of the inverting amplifier.

8. The fingerprint detection system of claim 7 wherein said first dimension is about one-half inch and said second dimension is about one-tenth inch.

9. The fingerprint detection system of claim 7 wherein the capacitive sensing cells are regularly spaced from each other at a pitch of about 50 microns.

10. The fingerprint detection system of claim 7 wherein the scanning array has from 20 to 50 rows and about 250 columns of capacitive sensing elements.

11. The fingerprint detection system of claim 7 wherein the scan control unit operates the scanning stages to scan the entire array of cells at a frame rate in the range of 100 to 1000 frames per second.

12. The fingerprint detection system of claim 7 wherein each capacitive sensor cell further comprises a switch connected across the inverting amplifier to short the amplifier's input to its output when the switch is closed causing the amplifier to settle at its logical threshold, whereby upon opening the switch the amplifier's output voltage swings inversely proportional to the capacitance between the first and second conductor plates.

13. A fingerprint detection system formed on a single semiconductor chip, the system comprising:

a rectangular scanning array defined by a first dimension and a second dimension wherein the first dimension is larger than the second dimension, the array comprising capacitive sensing cells arranged in rows and columns, the rows being aligned with the first dimension and the columns being aligned with the second dimension, the number of columns exceeding the number of rows;

a horizontal scanning stage connected to the array for scanning the rows of capacitive sensing cells;

a vertical scanning stage connected to the array for scanning the columns of capacitive sensing cells;

a scan control unit connected to the scanning stages for operating the scanning stages to enable one capacitive sensing cell at a time according to a predetermined scanning pattern to scan the entire array at a frame rate of at least 100 frames per second;

a thin protective layer disposed above the scanning array and providing a top surface for contact by a finger;

an A/D converter connected to each capacitive sensing cell and having an output; and output logic connected to the output of the A/D converter for capturing successive images at the frame rate as a finger is moved over the scanning array in a direction parallel to the second dimension while in contact with the top surface of the thin protective layer, and for assembling the successive images into a complete fingerprint image;

wherein each capacitive sensor cell comprises: adjacent first and second thin conductor plates, the conductor plates being closely spaced relative to each other and lying in a single plane proximate to and beneath the top surface of the protective layer; an inverting amplifier having an input and an output, the input being connected to the first conductor plate and the output being connected to the second conductor plate and to the A/D converter; and a reference voltage source connected to the input of the inverting amplifier.

14. The fingerprint detection system of claim 13 wherein said first dimension is about one-half inch and said second dimension is about one-tenth inch.

15. The fingerprint detection system of claim 13 wherein the capacitive sensing cells are regularly spaced from each other at a pitch of about 50 microns.

16. The fingerprint detection system of claim 13 wherein the scanning array has from 20 to 50 rows and about 250 columns of capacitive sensing elements.

17. The fingerprint detection system of claim 13 wherein the scan control unit operates the scanning stages to scan the entire array of cells at a frame rate in the range of 100 to 1000 frames per second.

18. The fingerprint detection system of claim 13 wherein each capacitive sensor cell further comprises a switch connected across the inverting amplifier to short the amplifier's input to its output when the switch is closed causing the amplifier to settle at its logical threshold, whereby upon opening the switch the amplifier's output voltage swings inversely proportional to the capacitance between the first and second conductor plates.

* * * * *